United States Patent [19]

Arsac et al.

[11] Patent Number: 5,620,802
[45] Date of Patent: Apr. 15, 1997

[54] HEAT-SEALABLE AND PEELABLE FILM FOR POLYSTYRENE CONTAINERS AND PROCESS FOR SEALING BY MEANS OF SAID FILM

[75] Inventors: Jean-François Arsac, Pau; Catherine Bonabal, Billere; Betty Laurent, Bernay, all of France

[73] Assignee: Elf Atochem S.A., Puteaux, France

[21] Appl. No.: 540,879

[22] Filed: Oct. 11, 1995

Related U.S. Application Data

[62] Division of Ser. No. 420,809, Apr. 12, 1995, Pat. No. 5,486,571, which is a division of Ser. No. 286,903, Aug. 8, 1994, Pat. No. 5,432,235, which is a continuation of Ser. No. 960,765, Oct. 14, 1992, abandoned.

[30] Foreign Application Priority Data

Oct. 18, 1991 [FR] France ................................. 91 12899

[51] Int. Cl.⁶ ............................. C08L 33/08; C08L 23/08
[52] U.S. Cl. ........................... 428/483; 428/480; 428/522; 525/227; 525/228
[58] Field of Search ................................ 428/483, 480, 428/522; 525/227, 228

[56] References Cited

U.S. PATENT DOCUMENTS

| | | | |
|---|---|---|---|
| 4,338,227 | 7/1982 | Ballard | 524/143 |
| 4,338,378 | 7/1982 | Nabeta et al. | 428/462 |
| 4,376,845 | 3/1983 | Metzger | 525/196 |
| 4,414,053 | 11/1983 | Karim et al. | 525/228 |

FOREIGN PATENT DOCUMENTS 62-11747  1/1987  Japan.

OTHER PUBLICATIONS

Patent Abstracts of Japan; vol. 11, No. 185 (C–428)(2632) Jun. 13, 1987 and JP–A–62–11761 (Denki Kagaku Kogyo K.K.).

*Primary Examiner*—Irina Zemel
*Attorney, Agent, or Firm*—Burns, Doane, Swecker & Mathis, L.L.P.

[57] ABSTRACT

The present invention relates to a heat-sealable and peelable film for polystyrene containers, consisting of at least one thin film comprising a mixture (a) of polystyrene and (b) of one or more copolymer(s) of ethylene and of acrylic derivatives.

It also relates to a process for sealing a polystyrene container by means of said film and to the heat-sealed polystyrene container thus obtained.

13 Claims, No Drawings

HEAT-SEALABLE AND PEELABLE FILM FOR POLYSTYRENE CONTAINERS AND PROCESS FOR SEALING BY MEANS OF SAID FILM

This application is a divisional of application Ser, No. 08/420,809, filed Apr. 12, 1995, U.S. Pat. No. 5,486,571, which is a divisional of application Ser. No. 08/286,903, filed Aug. 8, 1994, (now U.S. Pat. No. 5,432,235), which is a continuation of application Ser. No. 07/960,765, filed Oct. 14, 1992, abandoned.

BACKGROUND OF THE INVENTION

1. Field of the Invention

The present invention relates to a heat-sealable and peelable film for polystyrene containers.

It also relates to a process for sealing a polystyrene container by means of said film and to the heat-sealed polystyrene container. Finally, it relates to the use of a composition for producing a heat-sealable and peelable film for polystyrene containers.

Description of the Prior Art

Heat-sealable and peelable films are employed on a large scale for temporarily closing containers containing, for example, food products. During the use the consumer tears away the said film. Thus, these heat-sealed films must exhibit a number of characteristics which will be described concisely below.

The film must permit a leakproof closure of the container. It will be recalled that the characteristics of the sealing are the combined application of heating and of pressure, making it possible to melt the sealable layer and to "squash it" over the edge of the container to form the welding strip. In addition to a certain softening or squashing of the upper layer, a good sealing also requires a softening or distortion of the container. In a known manner, the sealing is performed with the aid of heating jaws (over a usual range from 100° C. to 220° C.), at an appropriate pressure generally from 0.1 to 1 MPa, for short times of the order of a second.

Such a film must also meet the peelability criteria which are defined by a peel strength needed to open the cap or lid. This peel strength is, in fact, representative of the tight adhesion between the sealable layer and the substrate. A strength of between 200 g/cm and 600 g/cm is usually synonymous with a good closure-opening compromise.

Furthermore, the industry today demands packaging in which all the constituents (films, decorations, caps) are recyclable with the main material. This increasingly requires the replacement of various materials such as paper, aluminum, laminates or coextrudates with adhesives of the "hot melt" type or those containing solvents.

Many heat-sealable films have already been proposed in order to satisfy the abovementioned criteria.

Thus, document EP-A-406,681 describes a multilayer heat-sealable film consisting of a layer of styrene/butadiene/styrene copolymer and of another layer based in particular on polyamide, it being possible for this film additionally to comprise an intermediate layer consisting, for example, of impact polystyrene (that is to say a polystyrene reinforced with a small quantity of polybutadiene), it being possible for the adhesion between the different layers to be improved by an adhesion promoter based on an ethylene/vinyl acetate/maleic anhydride copolymer.

Document JP-A-78-31934 [CA106 (26): 215186h] describes a heat-sealable film for polystyrene containers, containing a mixture of 15% of ethylene acrylate copolymer and 70% of a styrene/butadiene/styrene (SBS) block copolymer and 15% of a polystyrene. The disadvantage of the presence of SBS in a large quantity is due to the fact that the film loses some of its elasticity because of the degradation of SBS in the course of time (insufficient drawability), and this also entails an increase in its heterogeneity. Furthermore, this document is intended for the applications of films which can be closed again after opening (repeelability).

Document JP 86-166671 [CA106 (24): 197630s] describes a heat-sealable film for polystyrene containers, comprising a mixture of an ethylene and acrylate copolymer and a styrene/butadiene/styrene block copolymer.

Note should also be taken, in a different field, of document EP-A-412,503, which describes an adhesive composition containing a mixture of ethylene/vinyl acetate copolymer, of polystyrene, of polyacrylate, of a styrene/butadiene/styrene copolymer and of an ethylene/alpha-olefin copolymer. These compositions are not intended for the production of heat-sealable film.

SUMMARY OF THE INVENTION

Accordingly, a major object of the present invention is the provision of an improved heat-sealable and peelable film for polystyrene containers. The film includes at least one thin film (i) of a mixture which includes (a) polystyrene, (b) a copolymer or copolymers of ethylene and acrylic derivatives and, optionally, (c) a styrene/butadiene/styrene block copolymer. Another objective of the present invention is to propose a heat-sealable film which makes it possible to obtain a wide sealability range at temperatures lower than those needed with the other types of film.

Another aim of the present invention is to propose a heat-sealable film whose sealing is more homogeneous, the opening forces being, as a result of this, more uniform and, consequently, better controlled.

Another objective of the present invention is to propose a heat-sealable film whose subsequent peeling takes place under the required conditions.

Another objective of the present invention is to propose a heat-sealable film whose recycling is made possible similarly to that of the main material.

Other objectives and advantages of the present invention will appear in the light of the description below.

DETAILED DESCRIPTION OF THE PREFERRED EMBODIMENTS OF THE INVENTION

The heat-sealable and peelable film for polystyrene containers consists of at least one thin film comprising a mixture (a) of polystyrene and (b) of one or more copolymer(s) of ethylene and of acrylic derivatives.

It has in fact been found, in a manner which is quite surprising and contrary to the teaching of the prior art, especially document JP-78-31934 analyzed above, that a film not comprising appreciably any styrene/butadiene/styrene block copolymer has qualities which are superior to and/or different from the films which include this type of component. The term "appreciably any" means that the mixture must not comprise more than 5% by weight relative to the total weight of the mixture. The mixture preferably will not comprise more than approximately 3% of said copolymer.

Polystyrenes which are suitable for the present invention are well known to a person skilled in the art and are especially those exhibiting easy processability (coextrusion, lamination), good mechanical properties and recyclability. They generally have a molecular weight of between 100,000 and 350,000, in particular between 150,000 and 250,000.

The polystyrene employed is preferably an "impact" polystyrene, that is to say a polystyrene which has been reinforced by the addition of a small quantity (generally less than 10%) of polybutadiene. This "impact" polystyrene will in particular have a melt index of between 3 and 10 under 5 kg at 200° C.

Ethylene/acrylic ester copolymers are also well known in the art and are formed by random combination of the corresponding monomers in variable proportions. They exhibit a low melting point (between 50° C. and 100° C.) and a high adhesiveness.

The copolymers (b) preferably contain 60to 95% by weight of ethylene and 5 to 40% of acrylic derivatives.

It has been found that it is advantageous to employ a mixture of two of these copolymers, one having a higher melting point than the other. This mixture offers the advantage of a wider sealing temperature range and produces peelability.

One of these copolymers will advantageously have a melting point of between 60 and 80° C. and will contain between 60 and 80% by weight of ethylene and 20 to 40% of acrylic derivatives. The second copolymer will have a melting point of between 80° and 100° C. and will contain 75 to 95% by weight of ethylene and 5 to 25% of acrylic derivatives. The melt index of these copolymers under 2.16 kg at 190° is generally between 5 and 10 in the case of the first polymer and between 0.5 and 5 in the case of the second. The weight ratio of the second copolymer to the first copolymer will be preferably between 0.5 and 2.

The acrylic derivatives are preferably chosen from alkyl, especially $C_1$-$C_4$ alkyl, acrylates or methacrylates.

The acrylic derivative is advantageously methyl methacrylate.

According to a preferred alternative form of the invention, taken optionally in combination with the preceding alternative forms, the heat-sealable film is one in which the thin film comprises, on a weight basis relative to the total mixture:

a) 30 to 90% of polystyrene, b) 10 to 70% of copolymer of ethylene and of acrylic derivatives, c) optionally up to 5% of styrene/butadiene/styrene block copolymer, preferably less than 3%.

According to another alternative form which is also preferred in relation to the preceding one, the heat-sealable film is one wherein said thin film comprises, on a Weight basis relative to the total mixture:

a) 40% to 75% of polystyrene, b) 25to 60% of copolymer of ethylene and of acrylic derivatives, c) optionally up to 5% of styrene/butadiene/styrene block copolymer, preferably less than 3%.

In order to provide the heat-sealable film with some rigidity, it has been found that it is advantageous to place adjacent to it, by way of outer layer, an additional layer which does not melt at the sealing temperatures, and which is essentially rigid, such as, for example, a polyethylene terephthalate copolymer. The adhesion of the inner layer to the outer layer can be improved by the interposition of an adhesion promoter.

According to another alternative form the sealable and peelable multilayer film comprises an intermediate layer of polystyrene, the adhesion of this intermediate layer, on the one hand to the outer layer and, on the other hand, to the heat-sealable film described above being ensured in the same way by an adhesion promoter.

These films are normally obtained by extrusion or coextrusion or lamination in the case of multilayer films.

The invention also relates to a process for sealing a polystyrene container by means of a heat-sealable film which is also subsequently peelable, said process being one in which the container is closed in a leakproof manner with a film as defined above and in which a means for heating to a sufficient temperature to melt the layer as defined above and at a pressure of between 0.1 and 1 MPa (that is 1 and 10 bars) is applied to the edge of the container so as to make an essentially continuous weld over the whole of the edge.

As will be illustrated by the examples of embodiment, this process subsequently permits the peeling of the said film with a peel strength of between 200 and 600 g/cm and preferably higher than 300 g/cm.

The sealing temperature will be advantageously between 100° C. and 200° C., preferably between 120° and 160° C.

Permitting a heat-sealing at temperatures which are generally lower than those usually employed is therefore a great advantage of the present invention.

A further subject of the invention is a polystyrene container heat-sealed by a film as described above and obtained especially by the process described above.

Another subject of it is the use of a composition for the production of a heat-sealable and peelable film for polystyrene containers.

The invention is now illustrated by particular examples.

Films whose different formulations are shown below are extruded.

| polymer ex | PS | Composition of the films (%) | | SBS | Thickness (μm) |
| --- | --- | --- | --- | --- | --- |
| | | E/MA 28% | E/MA 15% | | |
| 1 | 65 | 15 | 15 | 5 | 100 |
| 2 | 65 | 30 | — | 5 | 100 |
| 3 | 70 | 15 | 15 | — | 100 |
| 4 | 60 | 20 | 20 | — | 100 |
| 5 | 50 | 25 | 25 | — | 100 |
| 6 | 80 | 10 | 10 | — | 100 |

PS denotes polystyrene with an M. W. of approximately 180,000.
E/MA 28% denotes ethylene/methyl acrylate copolymer containing 28% of methyl acrylate.
E/MA 15% denotes ethylene/methyl acrylate copolymer containing 15% of methyl acrylate.
SBS denotes styrene/butadiene.

These films are sealed under the following conditions:

jaw temperature: from 147° C. to 185° C.

jaw pressure: 0.4 MPa sealing period: 1 second.

The peeling is performed at a speed of 100 mm/min. The peel strength in g/cm is measured in a known manner.

The results are shown below for different sealing temperatures:

| T ex | 147 °C. | 152 °C. | 157 °C. | 162 °C. | 166 °C. | 171 °C. | 176 °C. | 182 °C. | 185 °C. |
|---|---|---|---|---|---|---|---|---|---|
| 1 |  | 186 | 181 | 203 | 219 | 238 | 268 | 282 |  |
| 2 |  | 169 | 173 | 186 | 228 | 199 | 225 | 325 |  |
| 3 |  | 362 | 320 | 317 | 324 | 297 | 251 | 249 |  |
| 4 | 395 | 350 | 275 | 288 | 265 | 260 | 232 | 225 | 179 |
| 5 | 393 | 371 | 348 | 347 | 316 | 338 | 335 | 268 | 212 |
| 6 |  | 285 | 278 | 234 | 234 | 229 | 201 | 181 | 199 |

Multilayer films are produced by lamination with the monolayer films of Examples 3 and 5.

Ex. 7: PET (12 μm)/PS(80 μm) / Ex. 3 (20 μm)

Ex. 8: PET (12 μm)/PS(80 μm) / Ex. 5 (20 μm).

The sealing and peeling conditions are identical with those above and result in highly satisfactory peel strengths.

What is claimed is:

1. A heat-sealable and peelable film for polystyrene containers comprising at least one thin film comprising a mixture of (a) polystyrene, (b) two or more copolymers of ethylene and of acrylic esters of different melting points, one of the polymers having a melting point of between 60° and 80° C. and a melt index under 2.16 kg at 190° C. of from 5 to 10, and one of the polymers having a melting point of between 80° and 100° C. and a melt index under 2.16 kg at 190° C. of from 0.5 to 5, and (c) up to 5% of styrene/butadiene/styrene block copolymer wherein the weight ratio of the second copolymer to the first copolymer is from 0.5 to 2.

2. The film as claimed in claim 1, wherein the said mixture comprises up to 3% of styrene/butadiene/styrene block copolymer.

3. The film as claimed in claim 1, wherein the polystyrene (a) is an impact polystyrene reinforced by addition of up to 10% by weight of polybutadiene.

4. The film as claimed in claim 1, wherein the copolymers (b) comprise, on a weight basis, a first copolymer consisting of 60 to 80% ethylene and 20 to 40% acrylic esters and a second copolymer consisting of 75 to 95% ethylene and 5 to 25% acrylic esters.

5. The film as claimed in claim 1, wherein the acrylic esters are an and an alkylacrylate or a methacrylate.

6. The film as claimed in claim 5, wherein the acrylic esters are a $C_1$-$C_4$ alkylacrylate or methacrylate.

7. The film as claimed in claim 6, wherein the acrylic ester is methyl methacrylate.

8. The film as claimed in claim 1, wherein said thin film comprises, on a weight basis in relation to the total mixture:

a) 30 to 90% of polystyrene, b) 10 to 70% of two or more copolymers of ethylene and of acrylic esters, and c) optionally, up to 5% of styrene/butadiene/styrene block copolymer.

9. The film as claimed in claim 8, wherein said thin film comprises, by weight relative to the total mixture:

a) 40 to 75% of polystyrene, b) 25 to 60% of copolymers of ethylene and of acrylic esters, and c) optionally, up to 5% of styrene/butadiene/styrene block copolymer.

10. The film as claimed in claim 9, wherein said thin film comprises, by weight relative to the total mixture:

a) 40 to 70% of polystyrene, and b) 30 to 40% of copolymers of ethylene and of acrylic esters.

11. The film as claimed in claim 1, said film (i) being an extruded film or coextruded with an additional film.

12. A sealable and peelable multilayer film comprising an internal layer as claimed in claim 1, a layer of polyethylene terephthalate which does not melt at the sealing temperatures and which is essentially rigid, and an interlayer of an adhesion promoter.

13. The film as claimed in claim 12, which comprises an intermediate polystyrene layer.

* * * * *